(12) United States Patent
Takeda et al.

(10) Patent No.: US 7,354,157 B2
(45) Date of Patent: Apr. 8, 2008

(54) IMAGE DISPLAY DEVICE AND LIGHT SOURCE DEVICE

(75) Inventors: Takashi Takeda, Suwa (JP); Masatoshi Yonekubo, Hana-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/462,570

(22) Filed: Aug. 4, 2006

(65) Prior Publication Data

US 2007/0035723 A1  Feb. 15, 2007

(30) Foreign Application Priority Data

Aug. 12, 2005  (JP) .............................. 2005-234104

(51) Int. Cl.
*G03B 21/26* (2006.01)
*G03B 21/28* (2006.01)
*G03H 1/02* (2006.01)
*G02B 27/14* (2006.01)
*G02B 27/20* (2006.01)
*G02F 1/00* (2006.01)
*H04N 5/74* (2006.01)
*H01S 3/10* (2006.01)

(52) U.S. Cl. ............................ 353/30; 353/31; 353/84; 353/99; 359/27; 359/629; 348/67; 348/771; 362/553; 362/259; 372/22; 372/28

(58) Field of Classification Search .................. 353/30, 353/31, 34, 37, 81, 82, 84, 98, 99, 102; 359/27, 359/326, 328, 331, 618, 629, 634; 348/67, 348/E9.026, 739, 742, 744, 750, 757–759, 348/771; 349/5, 7, 8; 362/553, 259; 372/22, 372/23, 25, 26, 28, 29.02, 29.023, 30, 32
See application file for complete search history.

(56) References Cited

U.S. PATENT DOCUMENTS

| | | | |
|---|---|---|---|
| 6,621,615 B2 | 9/2003 | Kruschwitz et al. | |
| 2002/0060753 A1 | 5/2002 | Flint | |
| 2005/0018723 A1* | 1/2005 | Morita et al. ............ | 372/29.02 |

FOREIGN PATENT DOCUMENTS

| | | |
|---|---|---|
| JP | A-08-240779 | 9/1996 |
| JP | A-2001-267670 | 9/2001 |

\* cited by examiner

*Primary Examiner*—Rochelle Blackman
(74) *Attorney, Agent, or Firm*—Oliff & Berridge, PLC

(57) ABSTRACT

An image display device includes a laser light source, a wavelength conversion element converting a wavelength of a light beam emitted from the laser light source into a predetermined wavelength, and a light modulating device modulating the laser beam output from the wavelength conversion element, wherein the laser beam emitted from the laser light source has a frequency of integral multiplication of the maximum modulation frequency of the light modulating device, and has a pulse width narrower than a time period during which the light modulating device is in a stable state.

7 Claims, 5 Drawing Sheets

IMAGE DISPLAY DEVICE AND LIGHT SOURCE DEVICE

BACKGROUND

1. Technical Field

The present invention relates to an image display device and a light source device.

2. Related Art

In recent years, while demands for downsizing of projectors are growing, in accordance with increase in output power of semiconductor lasers and appearance of blue semiconductor lasers, projectors or displays using laser light sources have been considered. Since the wavelength band of the light source is narrow, these devices can provide remarkably wide color reproduction range, and it is possible to downsize the devices and to eliminate composing elements thereof, thus the devices have great potential as display elements for the next generation.

As the light sources used for an image display device, three colors of laser light sources, namely R (red), G (green), and B (blue) laser light sources are required. Although original resonance for R and B can be realized by semiconductor lasers, there is no original resonance for G. Therefore, it has been considered to utilize the second harmonic wave generated by inputting an infrared laser beam to a nonlinear optical element (wavelength conversion element: SHG) (see, for example, JP-A-2001-267670).

Here, in an illuminating method used for the image display device equipped with a laser light source, grayscale is expressed by pulse width modulation or intensity modulation (see, for example, JP-A-8-24077). In an image projection system described in JP-A-8240779, a control circuit determines and controls the intensity variation of the light source so as to be synchronized with a data input signal to DMD.

However, if the pulse width modulation or the intensity modulation is used as in the related art described above, it becomes necessary to increase duty ratio of the laser beam pulses emitted from the light source or to increase the intensity of the laser beam converted by the wavelength conversion element in order for displaying bright images. This problematically shortens a life of the light source device. If the intensity of the laser beam is decreased to avoid this, the light density of the incident light to the wavelength conversion element decreases, and accordingly the wavelength conversion efficiency problematically decreases. Meanwhile, if the intensity of the laser beam is decreased in the case of the intensity modulation, the wavelength conversion efficiency of the wavelength conversion element problematically decreases in the same way.

SUMMARY

The invention addresses the above problems and has an advantage of providing an image display device and a light source device capable of enhancing conversion efficiency of a wavelength conversion element.

In order for obtaining the above advantage, the invention provides the following measures.

An image display device according to an aspect of the invention includes a laser light sources a wavelength conversion element converting a wavelength of a light beam emitted from the laser light source into a predetermined wavelength, and a light modulating device modulating the laser beam output from the wavelength conversion element, and the laser beam emitted from the laser light source has a frequency of integral multiplication of the maximum modulation frequency of the light modulating device, and has a pulse width narrower than a time period during which the light modulating device is in a stable state.

In the image display device according to the aspect of the invention, the light emitted from the laser light source has a frequency of integral multiplication of the maximum modulation frequency (a frequency in the minimum grayscale levels) of the light modulating device, and has a pulse width narrower than the time period during which the light modulation device is in a stable state. Namely, pulsed emission of the laser beam is performed while the light modulating device is stable. Thus, higher intensity of the laser beam can be obtained in comparison with the case in which the laser beam is continuously resonated at a constant level as in the related art. As described above, since intensity of incident laser beam can be enhanced compared to the related art when the light emitted from the laser light source is input to the wavelength conversion element, the wavelength conversion efficiency can be improved. Therefore, clearer images can be displayed.

Further, in an image display device according to another aspect of the invention, the laser beam emitted from the laser light source preferably has emission timing synchronized with timing of the minimum drive period of the light modulating device.

In the image display device according to this aspect of the invention, since the emission timing of the laser beam is synchronized with the timing of the minimum drive period of the light modulating device, the laser beam is emitted only when the light modulating device is stable, and the laser beam is not emitted while the light modulating device is responding. Therefore, any effects of unnecessary laser beams to the image display can be eliminated thus images with preferable qualities can be obtained.

Further, in an image display device according to another aspect of the invention, a duty ratio of the pulse of the laser beam emitted from the laser light source is preferably no greater than fifty percent.

In the image display device according to this aspect of the invention, since the duty ratio of the pulses of the laser beam is no greater than 50%, the intensity can be more than twice the intensity of the laser beam continuously resonated at a constant level. Therefore, the intensity of the incident light beam can further be enhanced, thus the wavelength conversion efficiency can be improved.

Further, in an image display device according to another aspect of the invention, two or more of pulses of the laser beam are preferably emitted in the minimum drive period of the light modulating device, and the pulse width in emitting two or more pulses of the laser beam is preferably narrower than the pulse width in emitting only one pulse of the laser beam.

In the image display device according to this aspect of the invention, two or more of pulses of the laser beam are emitted in the minimum drive period of the light modulating device, and the pulse width in emitting two or more pulses of the laser beam is arranged to be narrower than the pulse width in emitting only one pulse of the laser beam. Accordingly, the light intensity more than twice as high as the light intensity in the case in which only one pulse of laser beam is emitted in the minimum drive period of the light modulating device can be obtained. Therefore, the intensity of the incident light beam can further be enhanced, thus the wavelength conversion efficiency can be improved.

Further, a light source device according to another aspect of the invention is for use with an image display device, the image display device including a laser light source a wavelength conversion element converting a wavelength of a light beam emitted from the laser light source device into a predetermined wavelength, and a light modulating device modulating the laser beam output from the wavelength conversion element, and the laser beam emitted from the laser light source device has a frequency of integral multiplication of the maximum modulation frequency of the light modulating device, and has a pulse width narrower than a time period during which the light modulating device is in a stable state.

In the light source device according to this aspect of the invention, the light emitted from the laser light source device has a frequency of integral multiplication of the maximum modulation frequency (a frequency in the minimum grayscale levels) of the light modulating device, and has a pulse width narrower than the time period during which the light modulation device is in a stable state. Namely, pulsed emission of the laser beam is performed while the light modulating device is stable. Thus, higher intensity of the laser beam can be obtained in comparison with the case in which the laser beam is continuously resonated at a constant level as in the related art. As described above, since intensity of incident light can be enhanced compared to the related art when the light emitted from the laser light source device is input to the wavelength conversion element, the wavelength conversion efficiency can be improved.

Further, in the light source device, the laser beam emitted from the laser light source preferably has emission timing synchronized with timing of the minimum drive period of the light modulating device.

In the light source device according to this aspect of the invention, since the emission timing of the laser beam is synchronized with the timing of the minimum drive period of the light modulating device, the laser beam is emitted only when the light modulating device is stable, and the laser beam is not emitted while the light modulating device is responding. Therefore, since the necessary laser beam irradiation can be eliminated, the life of the light source device can be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
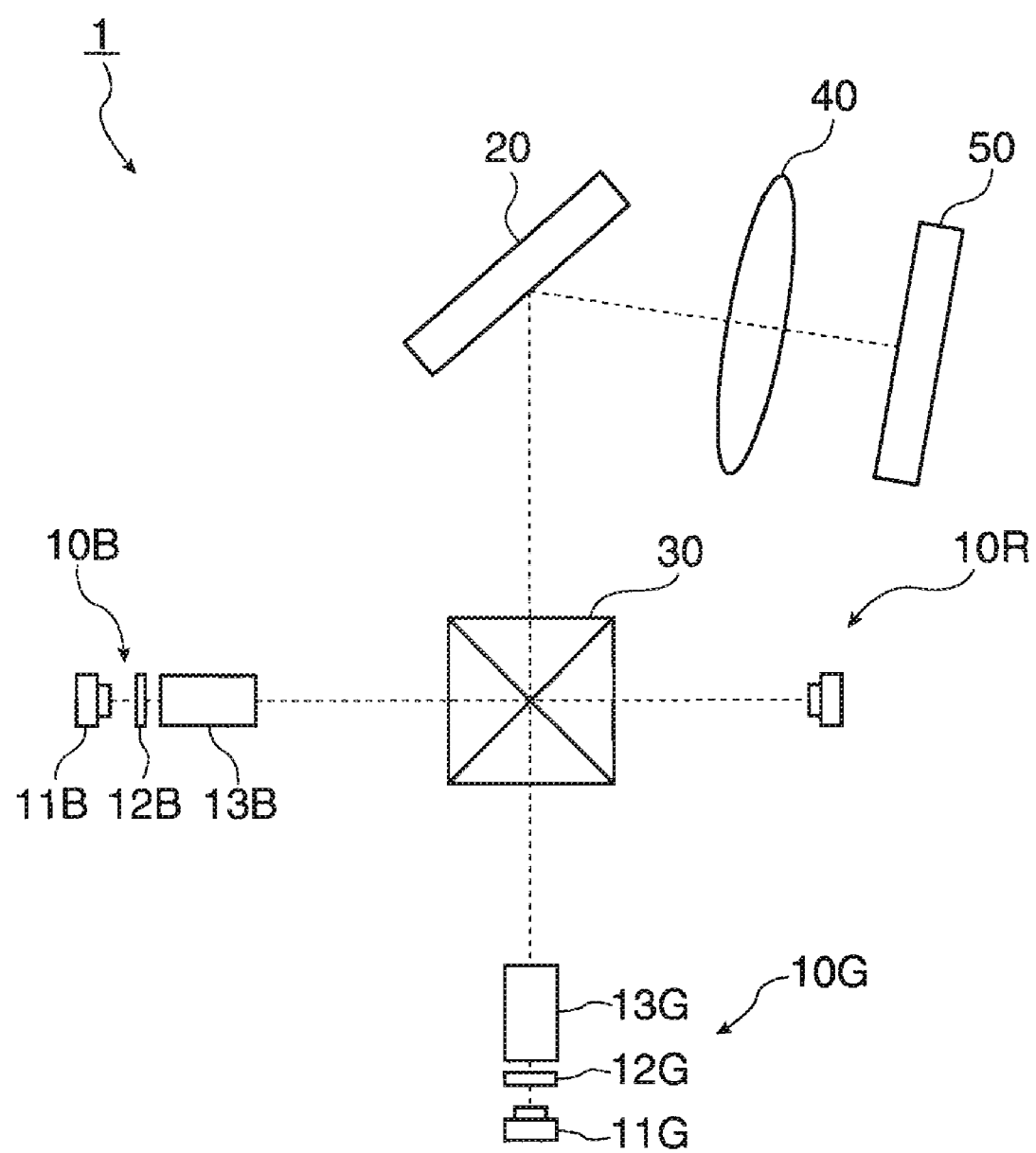
FIG. 1 is a schematic view showing a projector according to a first embodiment of the invention.

An embodiment of the invention will hereinafter be explained with reference to the accompanying drawings. Note that in the drawings referred to below, each of the composing elements is described with a scale appropriately modified for making the drawings conspicuous.

First Embodiment of Projector

FIG. 1 is a schematic view showing an example of a projector (an image display device) according to a first embodiment of the invention.

A projector 1 of the present embodiment is an example using a three-plate system and provided with a red light source device 10R for emitting a red laser beam, a green light source device 10G for emitting a green laser beam, a blue light source device 10B for emitting a blue laser beam, light modulating devices 20 for modulating brightness of an R light beam, a G light beam, and a B light beam emitted from the light source devices 10R, 10G, and 10B, respectively, a cross dichroic prism 30 for composing the light beams of respective colors modulated by the respective light modulating devices 20 to form a color image, a projection lens 40 for projecting the color image output from the cross dichroic prism 30 on a screen 50, and a control section 60 for controlling the light source devices 10R, 10G, and 10B and the light modulating devices 20.

The green light source device 10G is equipped with a laser light source (e.g., wavelength of 1060 nm) 11G for emitting an infrared laser beam, an external resonator mirror 12G, and a wavelength conversion element 13G. Here, although the original resonance for the R light beam and the B light beam can be realized by semiconductor lasers, there is no original resonance for the G light beam. Therefore, it is necessary to input an infrared laser beam to a nonlinear optical element (wavelength conversion element: SHG) to perform wavelength conversion for obtaining the G light beam. Further, although the original resonance for the B light beam can be realized by the semiconductor laser, the blue light source device 10B of the present embodiment is equipped with a laser light source (e.g., wavelength of 920 nm) 11B for emitting an infrared laser beam, an external resonator mirror 12B, and a wavelength conversion element 13B, and the B light beam is obtained by inputting the infrared laser beam to the wavelength conversion element 13B to perform the wavelength conversion. Note that the R light beam can also be obtained similarly by converting the wavelength of an infrared laser beam using the wavelength conversion element.

The external resonator mirrors 12G and 12B are for efficiently reflecting the light beams emitted by the laser light sources 11G and 11B towards the laser light sources 11G and 11B, respectively, and are elements for forming the laser resonators together with the laser light sources 11G and 11B. In other words, the laser light sources 11G, 11B and the external resonator mirrors 12G, 12B form the laser resonators, respectively. The reflectance of each of the external resonator mirrors 12G, 12B is arranged to be, for example, about 99 per sent.

The wavelength conversion elements 13G, 13B are nonlinear optical elements for converting the wavelength of the incident light beam. Further, the wavelength conversion elements 13G, 13B input the light beams emitted by the laser light sources 11G, 11B and transmitted by the external resonator mirrors 12G, 12B, and output them while converting their wavelengths, respectively. In other words, the wavelength conversion elements 13G, 13B perform the wavelength conversion on the light beams emitted from the laser resonators composed of the laser light sources 11G, 11E and the external resonator mirror 12G, 12B, respectively. Namely, the wavelength conversion elements 13G, 13B convert the wavelengths of the infrared laser beams emitted by the laser light sources 11G, 11B into approximately half thereof to generate the green and the blue laser beams, respectively. Here, as the wavelength conversion elements 13G, 13B, those of waveguide type with plate shapes are used. In the case in which such waveguide type of wavelength conversion elements 13G, 13B are adopted, since the thicknesses of the wavelength elements 13G, 13B are small, a periodic domain inversion structure can easily be formed, the wavelength conversion efficiency can easily be enhanced, and the manufacturing cost can be reduced.

Note that, although in the present embodiment, the laser resonators are composed of the laser light sources 11G, 11B and the external resonator mirrors 12G, 12B, respectively, they are not so limited, but can have a structure in which the resonators are provided inside the laser light sources 11G, 11B, respectively. Further, although the laser light sources 11G, 11B, the external resonator mirrors 12G, 12B, and the wavelength conversion elements 13G, 13B are disposed in this order, the wavelength conversion elements 13G, 13B can be disposed between the laser light sources 11G, 11B and the external resonator mirrors 12G, 12B, respectively.

As the light modulating device 20, a tilt mirror device (hereinafter referred to as mirror device 20) is used in the present embodiment. As an example of the tilt mirror device, DMD produced by Texas Instruments can be cited.

Figure 2:
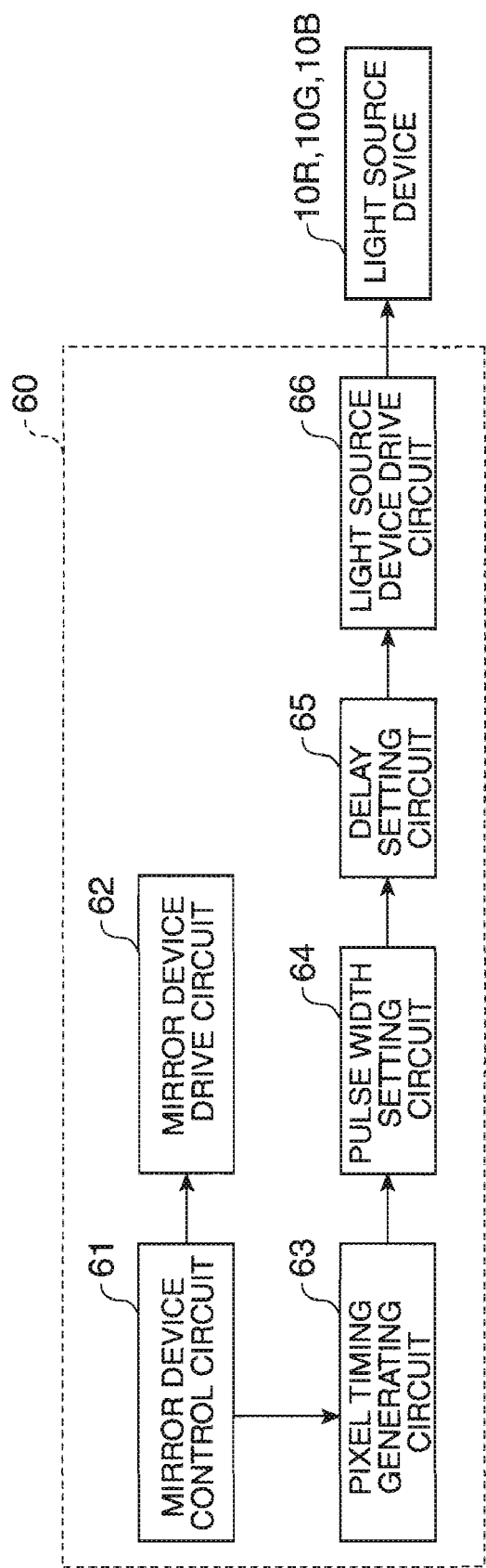
FIG. 2 is a block diagram of a control section of the projector according to the first embodiment of the invention.

The control section 60 will now be explained with reference to the block diagram of FIG. 2.

There are provided a mirror device control circuit 61 for controlling each of the mirror devices 20, a mirror device drive circuit 62 for driving each of the mirror devices 20, a pixel timing generating circuit 63 for generating the pixel timing in accordance with an electrical signal from the mirror device control circuit 61, a pulse width setting circuit 64 for setting the pulse width of the laser beam emitted from each of the light source devices 10R, 10G, and 10B in accordance with the generated pixel timing, a delay setting circuit 65 for setting an amount of delay in the pulse of each of the light source devices 10R, 10G, and 10B from the rising edge of the pixel timing, and a light source device drive circuit 66 for driving each of the light source devices 10R, 10G and 10B.

Note here that a light emission control signal input to the light source device drive circuit 66 is provided with a predetermined delay from the rising edge of the pixel timing and for generating laser-ON periods. And, in sync with the light emission control signal, the laser beam to be input to the cross dichroic prism 30 is emitted from each of the light source devices 10R, 10G, and 10B.

Figure 3:
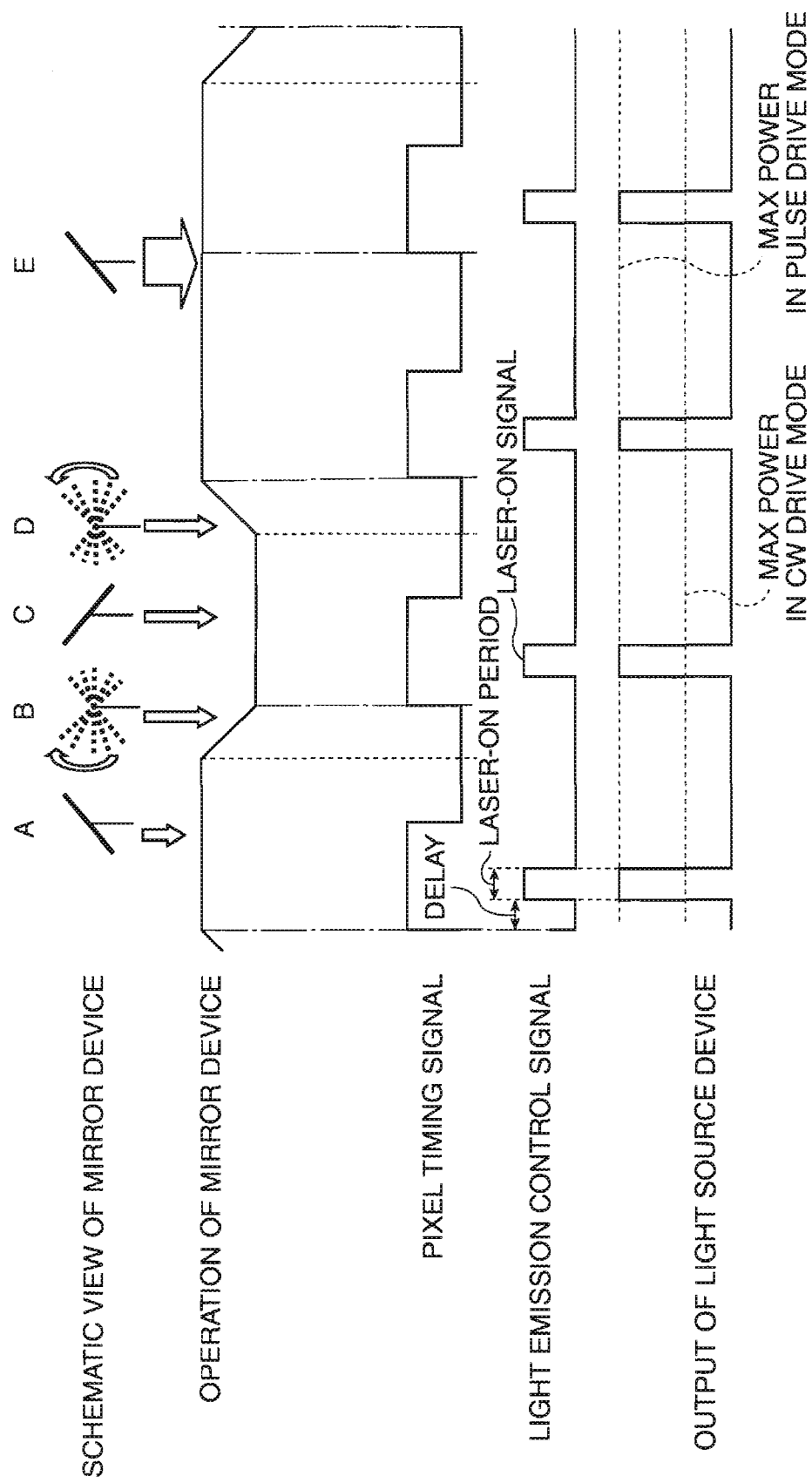
FIG. 3 is a chart for showing pixel timing and output of the laser beam emitted from a light source device in accordance with the operation of a light modulating device.

The light emission control signal generated by the pulse width setting circuit 64 has a frequency of integral multiplication of the maximum modulation frequency of the mirror device 20; and has a width narrower than a time period during which the mirror device is in a stable state the time period during which the mirror device is in the A state) as shown in FIG. 3. Further, as shown in FIG. 3, the light emission control signal has light emission timing synchronized with the minimum drive period timing of the mirror device 20. Further, the duty of the pulses of the laser beam emitted from each of the light source devices 10R, 10G, 10B is set to be no greater than 50%.

The cross dichroic prism 30 is composed of a dichroic film for reflecting the B light beam and transmitting the G light beam and the R light beam, and a dichroic film for reflecting the G light beam and transmitting the B light beam and the R light beam disposed perpendicular to each other in an X-shape. The cross dichroic prism 30 combines the R light beam, the G light beam, and the B light beam emitted from the light source devices 10R, 10G, and 10B, respectively. The light beam combined by the cross dichroic prism 30 enters the mirror device 20 and is reflected by the mirror device 20 towards the projection lens 40. After that, the light beam is projected on the screen 50 by the projection lens 40.

A method of protecting an image on the screen 50 using the projector 1 according to the present embodiment thus configured will now be explained.

Firstly, FIG. 3 shows the pixel timing and the output of the laser beam emitted from each of the light source devices 10R, 10G, and 10B in accordance with the operation of the mirror device 20.

There is transition period of the mirror device (the B state) from when a switching operation is started in the A state (pixel-ON state) of the mirror device 20 to when the mirror device is settled in the C state (pixel-OFF state). The minimum drive period (total period of the A state period and the B state period) of this operation is sent from the mirror device control circuit 61 to the pixel timing generating circuit 63. And, the pixel timing generating circuit 63 generates the pixel timing signal so as to be synchronized with the minimum drive period. Further, when the stable state of the mirror device 20 is longer than the minimum drive period as is the case with the E state, a plurality of pulses in the pixel timing arise during the mirror device 20 is in the E state (continuation of the same states). Meanwhile, the mirror drive timing is sent to the mirror device drive circuit 62 from the mirror device control circuit 61 to perform switching of the mirror device 20.

Then, the light emission control signal is generated in the pulse width setting circuit 64, and the light emission control signal is then delayed from the rising edge of the pixel timing by the delay generated by the delay setting circuit 65. The light emission control signal thus generated is sent to the laser drive circuit 66 to make each of the light source devices 10R, 10G, and 10B emit the laser beam in accordance with the laser-ON periods of the light emission control signal.

In this case, the infrared laser beams emitted from the laser light sources 11G, 11B are converted in their wavelengths by passing through (one-pass) the wavelength conversion elements 13G, 13B, respectively. Here, the infrared laser beams are shortened in the wavelengths to be converted into the green laser beam and the blue laser beam, respectively, and emitted to the cross dichroic prism 30. Further, the light beam emitted from the light source device 10R also proceeds to the cross dichroic prism 30. According to the above process, the light beams emitted from the light source devices 10R, 10G, and 10B and combined by the cross dichroic prism 30 enter the mirror device 20. The light beam reflected by the mirror device 20 is projected on the screen 50 by the projection lens 40, and thus an enlarged image is displayed.

According to the projector 1 of the present embodiment, the light beam can be emitted from each of the light source devices 10R, 10G, and 10B with intensity (the maximum power in the pulse drive mode) more than twice the typical constant level (the maximum power in the continuous wave (CW) drive mode) of intensity. Therefore, it becomes possible to increase the density of the light beams emitted from the green light source device 10G and the blue light source device 10B and entering the wavelength conversion elements 13G, 13B, respectively to enhance the wavelength conversion efficiency, and thus clearer images can be displayed.

Further, by synchronizing the light emission timing with the timing of the minimum drive period of the mirror device 20, the laser beam can be put on while the mirror device is in the stable state, and the laser beam is not put on during the mirror device 20 is in the transition state. Therefore, any effects of unnecessary laser beams on the image display can be eliminated, thus images with preferable qualities can be obtained.

Moreover, since the unnecessary laser beam irradiation can be eliminated in the light source devices 10R, 10G, and 10B, the life of the light source devices can be enhanced. Therefore, by applying the above to the projector 1, full-color display of high quality and high grade can be obtained, and lower power consumption, lower cost, and so on can be achieved.

A second embodiment according to the invention will now be explained with reference to FIGS. 4 and 5. Note that in the embodiments described hereinafter, portions with configurations common to the projector 1 according to the first embodiment will be denoted with the same reference numerals, and the explanations therefor will be omitted.

Figure 5:
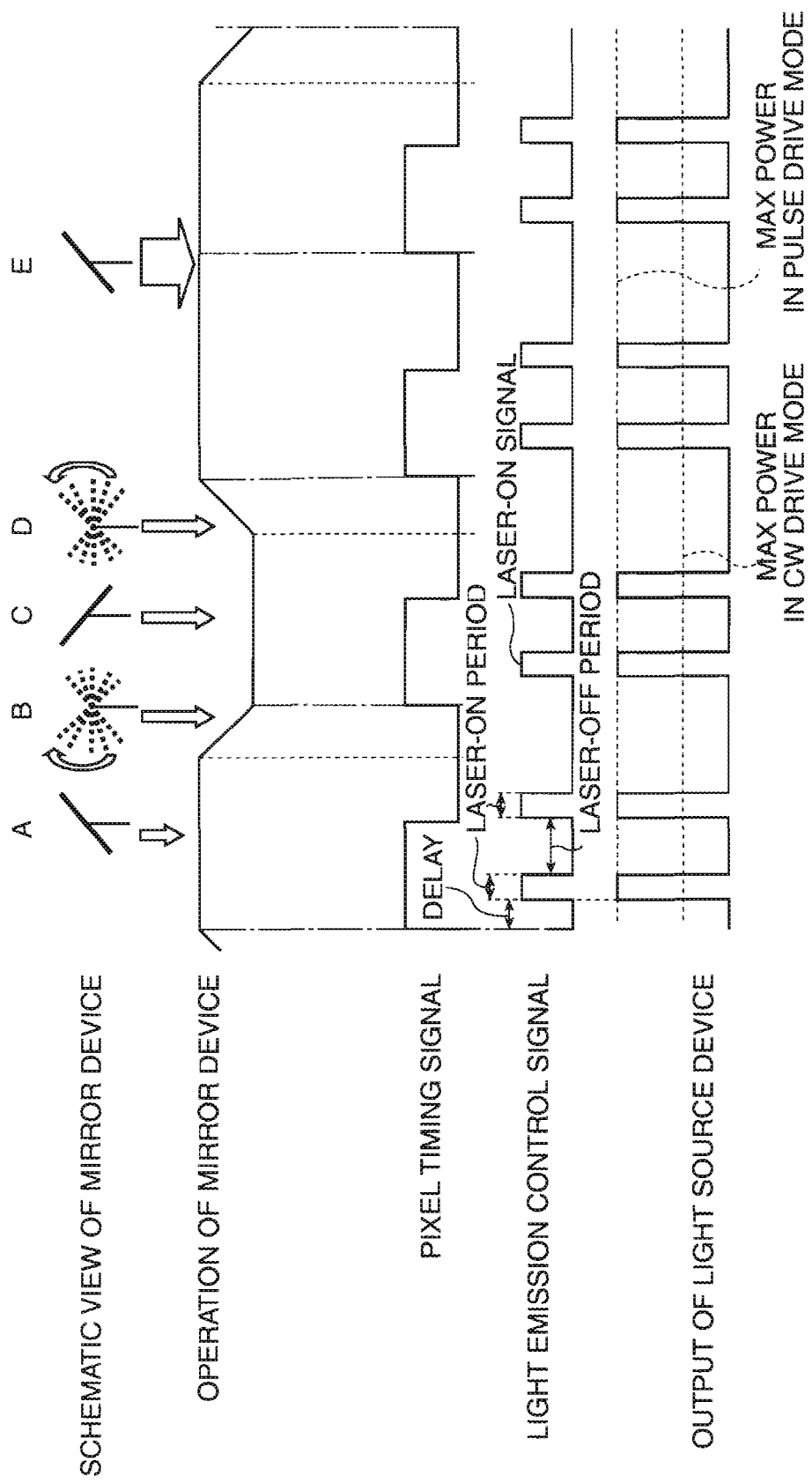
FIG. 5 is a chart for showing pixel timing and output of the laser beam emitted from a light source device in accordance with the operation of a light modulating device of the projector according to the second embodiment of the invention.

In a projector 70 according to the present embodiment, a different point from the first embodiment is that the laser beam is emitted in accordance with a first pulse 71 and a second pulse 72 in the minimum drive period of the mirror device 20 in the second embodiment as shown in FIG. 5.

Although the configuration of the projector 70 is the same as the configuration of the projector 1 of the first embodiment, a control section 80 is different from that of the first embodiment.

Figure 4:
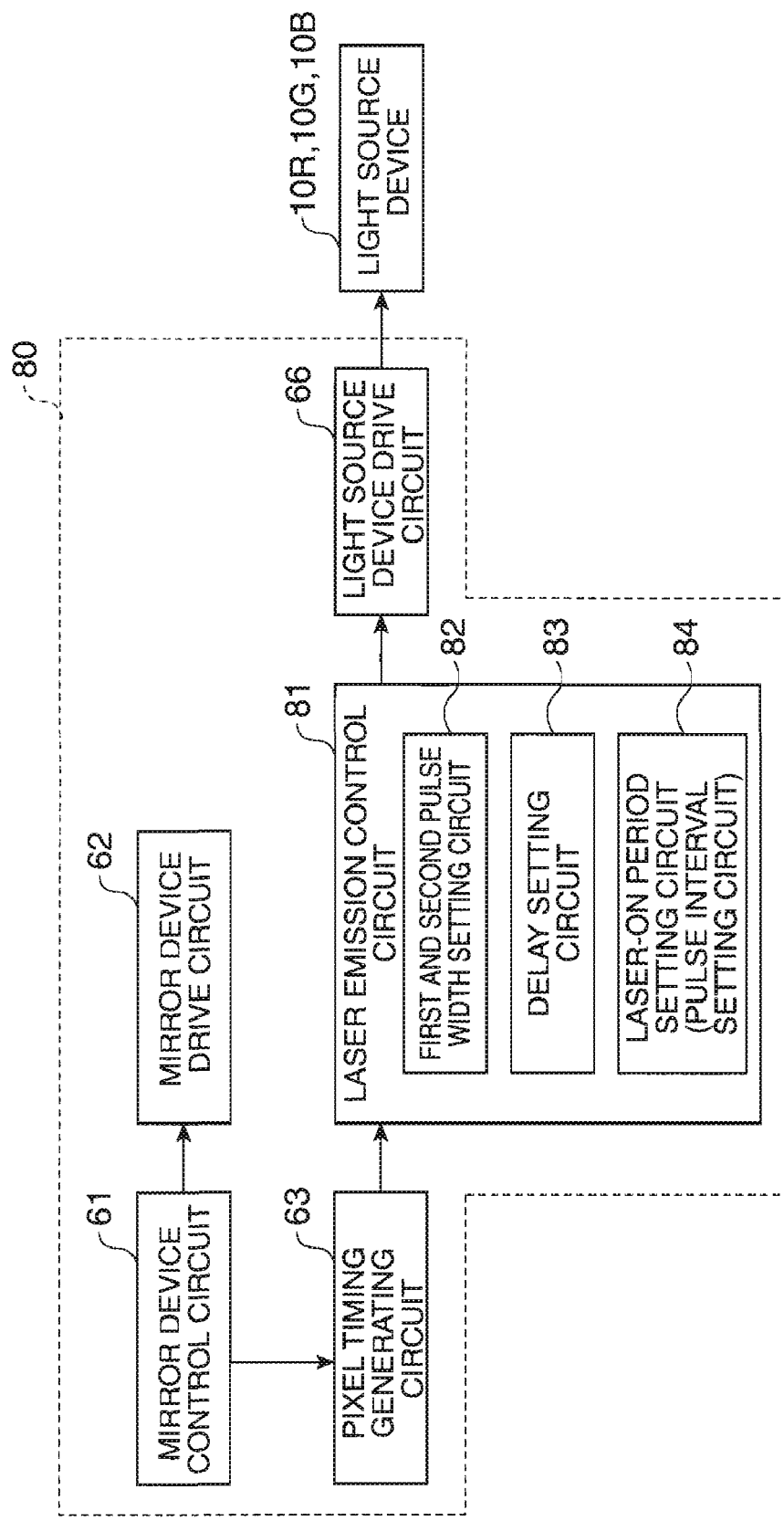
FIG. 4 is a block diagram of a control section of a projector according to a second embodiment of the invention.

As shown in FIG. 4, the control section 80 is provided with a laser emission control circuit 81 for generating a light emission control signal in accordance with the pixel timing generated by the pixel timing generating circuit 63. The laser emission control circuit 81 is provided with a first and second pulse width setting circuit 82 for setting the widths of the first and the second pulses 71, 72 of the laser beam emitted from each of the light source devices 10R, 10G, and 10B, a delay setting circuit 83 for setting an amount of delay of the first pulse 71 of each of the light source devices 10R, 10G, and 10B from the rising edge of the pixel timing, a laser-OFF period setting circuit (a pulse interval setting circuit) 84 for setting the laser-OFF period from the first pulse 71 to the second pulse 72. Further, as shown in FIG. 5, the light emission control signal preferably has light emission timing of the first pulse 71 synchronized with the minimum drive period timing of the mirror device 20. Further the laser-ON period (the width of the pulse for emitting the laser beam) is shorter than in the first embodiment as shown in FIG. 5. Further, the first and the second pulses 71, 72 are terminated in the period in which the mirror device 20 is in the stable state.

A method of projecting an image on the screen 50 using the projector 70 according to the present embodiment thus configured will now be explained.

Firstly, FIG. 5 shows the pixel timing and the output of the laser beam emitted from each of the light source devices 10R, 10G, and 10B in accordance with the operation of the mirror device 20.

Before all similarly to the case with the first embodiment, the mirror drive timing is sent from the mirror device control circuit 61 to perform switching of the mirror device 20.

Then, the light emission control signal is generated in the laser emission control circuit 81. The light emission control signal is synchronized with the rising edge of the pixel timing, and is delayed from the rising edge of the pixel timing by the delay generated by the delay setting circuit 83 to generate the first pulse 71. After that, the laser-OFF period is set in the laser-OFF period setting circuit 84 to generate the second pulse 72. The laser beam is emitted from each of the light source devices 10R, 10G, and 10B in accordance with the laser-ON period of the light emission control signal. The light beams emitted from the green light source device 10G and the blue light source device 10B are converted into predetermined wavelengths by the wavelength conversion elements 13G, 13B, respectively, and the light beam composed similarly to the case with the first embodiment is projected on the screen 50 by the projection lens 40, and thus enlarged images can be displayed.

According to the projector 70 of the present embodiment, the laser beam is emitted in accordance with the two pulses, the first and the second pulses 71, 72 in the minimum drive period of the mirror device 20. Accordingly, the light intensity more than twice as high as the light intensity in the case in which only one pulse of laser beam is emitted in the minimum drive period of the mirror device 20 can be obtained. Therefore, since it becomes possible to increase the density of the light beams emitted from the green light source device 10G and the blue light source device 10B and entering the wavelength conversion elements 13G, 13B, respectively, the wavelength conversion efficiency can be enhanced.

Note that is also possible to emit two pulses of laser beam in the minimum drive period of the mirror device 20. Further, a configuration provided with a delay setting circuit for setting an amount of delay in the pulse of each of the light source devices 10R, 10G, and 10B from the rising edge of the pixel timing, and a pulse train setting circuit for setting a pulse width and an interval between the pulses can also be adopted as the laser emission control circuit 81. Namely, the laser emission control circuit 81 can be a circuit for setting the pulse train so that a plurality of pulses are generated in the period during which the mirror device 20 is in the stable state.

Note that the scope of the present invention is not limited to each of the embodiments described above, but various modifications can be executed thereon within the scope or the spirit of the invention.

For example, although in each of the embodiments described above the duty ratio of the pulse of the laser beam emitted from each of the light source devices 10R, 10G, and 10B is set to be no greater than 50% and the laser beam is emitted with more than twice the intensity, it is sufficient for the laser beam at least to have a frequency of integral multiplication of the maximum modulation frequency of the mirror device 20, and have a width narrower than a time period during which the mirror device 20 is in a stable state. By emitting such a laser beam, it becomes possible to obtain higher light intensity than the typical constant level of light intensity.

Further, although the explanations are made using the mirror device (DMD) as the light modulating device, the light modulating device is not limited thereto, but can be a GLV for modulating light using diffraction of light or a liquid crystal spatial light modulation device for modulating light utilizing liquid crystal. Further, although the explanations are made using the single panel system, the system is not so limited, but can be a multi-panel system such as a three-panel system. Further, although the cross dichroic prism 30 is used for the combination, a dichroic mirror can also be used for combining the light beams emitted from the light source devices 10R, 10G, and 10B.

The entire disclosure of Japanese Patent Application No. 2005-234104, filed Aug. 12, 2005 is expressly incorporated by reference herein.

What is claimed is:

1. An image display device comprising:
    a laser light source;
    a wavelength conversion element converting a wavelength of a laser beam emitted from the laser light source into a predetermined wavelength; and
    a light modulating device modulating the laser beam output from the wavelength conversion element,
    wherein the laser beam emitted from the laser light source has a frequency of integral multiplication of the maximum modulation frequency of the light modulating device, and has a pulse width narrower than a time period during which the light modulating device is in a stable state, and
    wherein a pulsed emission of the laser beam is performed while the light modulating device is in the stable state.

2. The image display device according to claim 1 wherein the laser beam emitted from the laser light source has emission timing synchronized with timing of the minimum drive period of the light modulating device.

3. The image display device according to claim 1 wherein a duty ratio of a pulse of the laser beam emitted from the laser light source is no greater than fifty percent.

4. The image display device according to claim 1 wherein two or more of pulses of the laser beam are emitted in the minimum drive period of the light modulating device, and the pulse width in emitting two or more pulses of the laser beam is narrower than the pulse width in emitting only one pulse of the laser beam.

5. A light source device for use with an image display device, the image display device including:
    a laser light source,
    a wavelength conversion element converting a wavelength of a laser beam emitted from the laser light source into a predetermined wavelength, and
    a light modulating device modulating the laser beam output from the wavelength conversion element,
    wherein the laser beam emitted from the laser light source has a frequency of integral multiplication of the maximum modulation frequency of the light modulating device, and has a pulse width narrower than a time period during which the light modulating device is in a stable state, and
    wherein a pulsed emission of the laser beam is performed while the light modulating device is in the stable state.

6. The light source device according to claim 5 wherein the laser beam emitted from the laser light source has emission timing synchronized with timing of the minimum drive period of the light modulating device.

7. The image display device according to claim 1, wherein the light modulating device includes a plurality of mirror devices.

* * * * *